March 15, 1966 R. E. FISHER 3,239,873
LOAD BRAKING CASTER
Filed Oct. 30, 1964 3 Sheets-Sheet 1
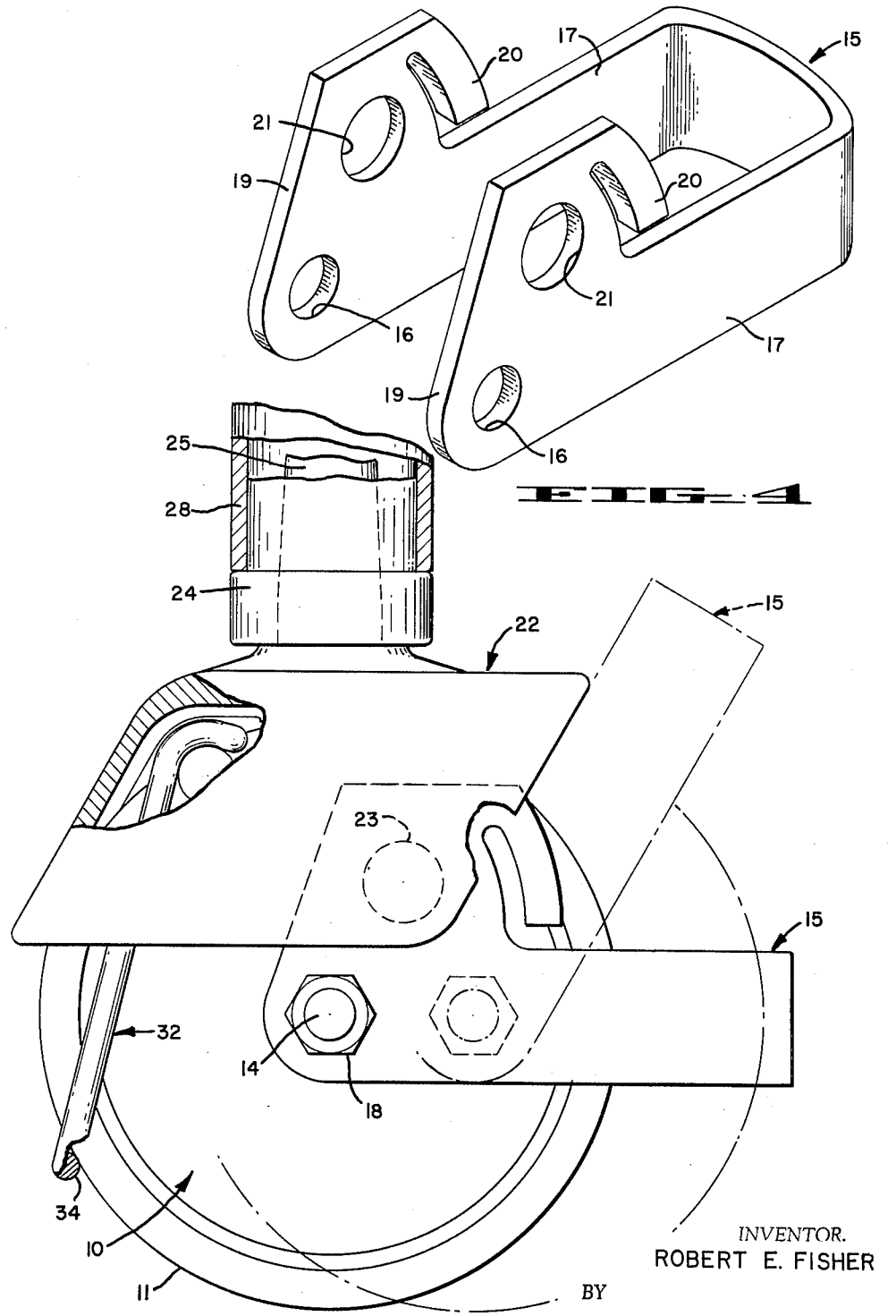
INVENTOR.
ROBERT E. FISHER
BY
Mellin, Moore + Weissenberger
ATTORNEYS March 15, 1966 R. E. FISHER 3,239,873
LOAD BRAKING CASTER
Filed Oct. 30, 1964 3 Sheets-Sheet 2
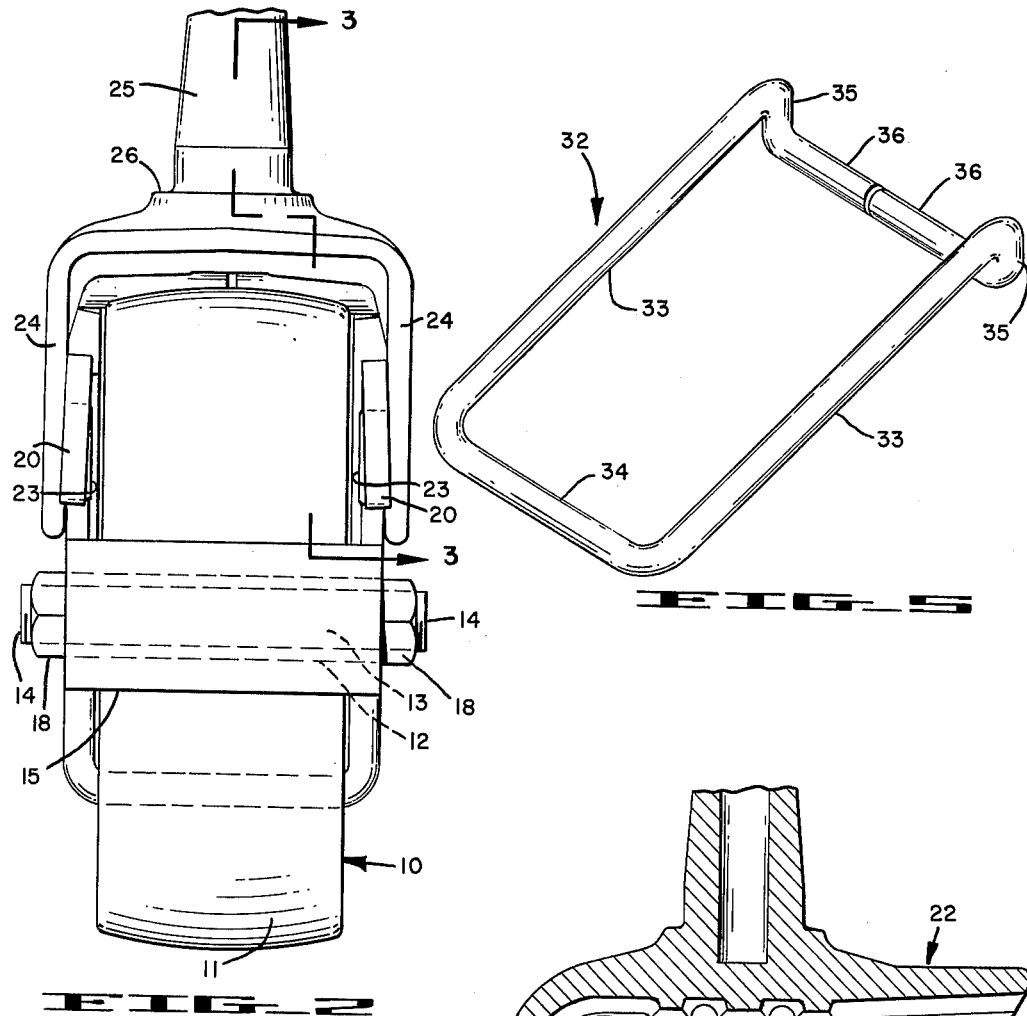
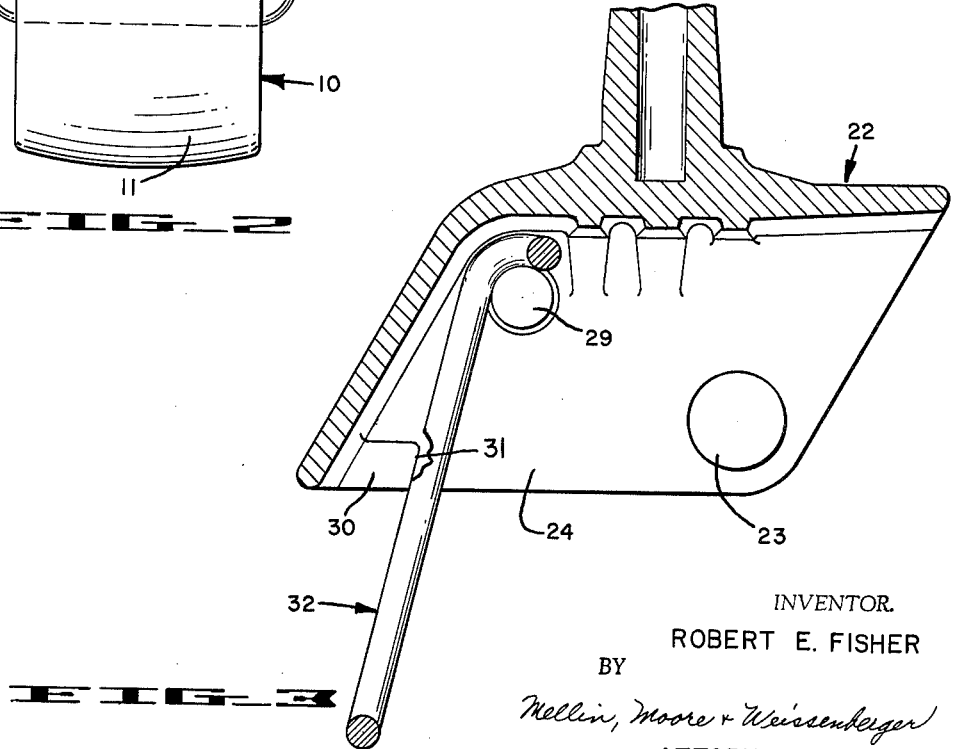
INVENTOR.
ROBERT E. FISHER
BY
Mellin, Moore + Weissenberger
ATTORNEYS

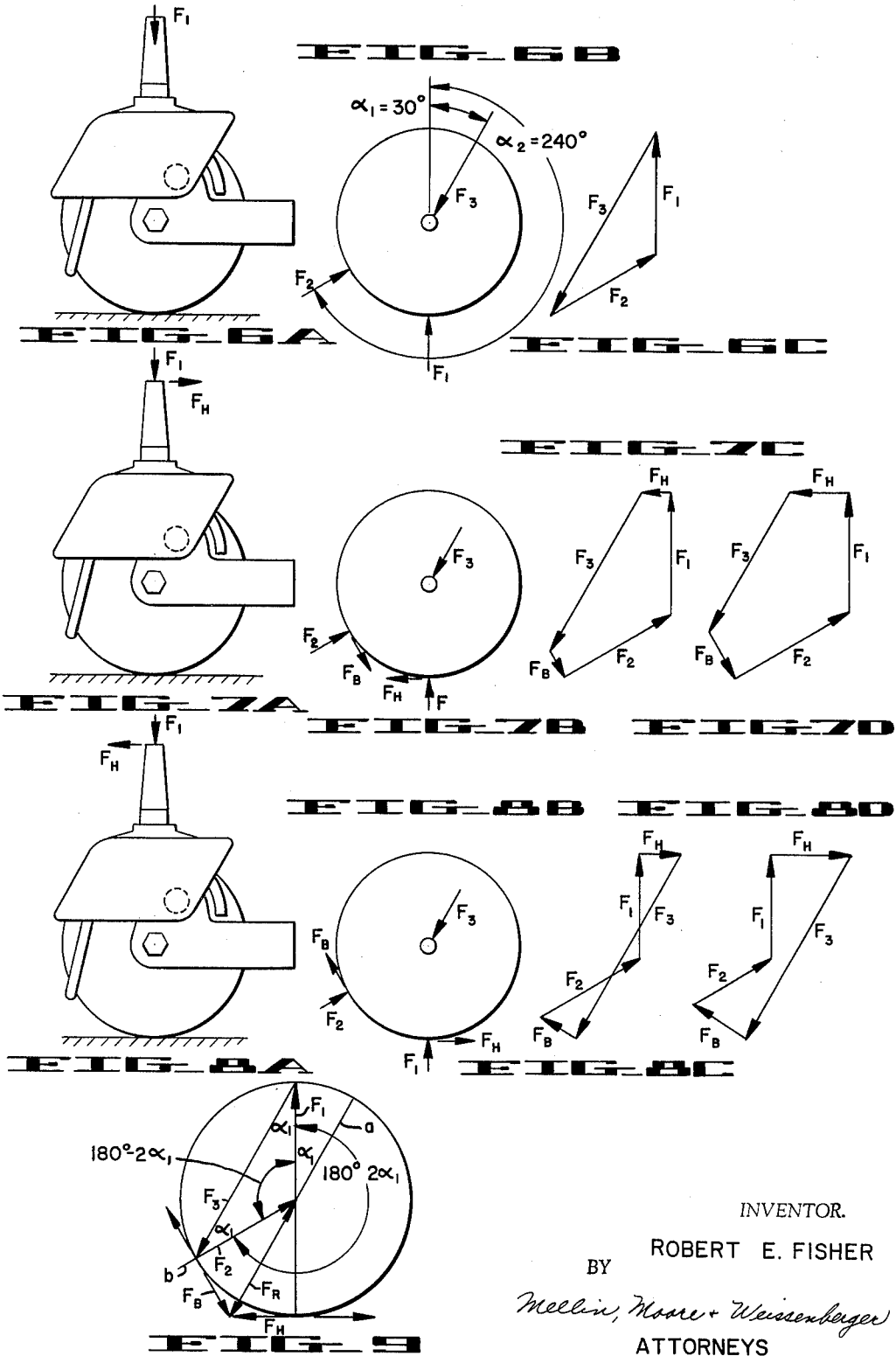

United States Patent Office 3,239,873
Patented Mar. 15, 1966

3,239,873
LOAD BRAKING CASTER
Robert E. Fisher, Berkeley, Calif., assignor to Up-Right, Inc., Berkeley, Calif., a corporation of California
Filed Oct. 30, 1964, Ser. No. 407,789
3 Claims. (Cl. 16—35)

This invention relates to a caster for use with scaffolding or other loads.

The principal object of this invention is the provision of a caster which can be quickly and effectively braked against both rotation of the caster wheel about its own axis and against pivotal movement of the caster wheel about a vertical axis, and in which the braking force is equal to the load carried by the caster and is not affected by horizontal forces on the load.

More specifically, the present invention is an improvement of the type caster disclosed in Patent No. 2,512,941, issued on June 27, 1950, to Wallace J. S. Johnson. The caster shown in said prior patent is load-actuated in that the frictional braking force imposed by the caster housing on the caster wheel varies in direct proportion to the load carried by the caster. However, as disclosed in said patent, the braking force is equal to one-half of the load on the caster; whereas in the present invention the braking force on the caster wheel is equal to the entire load on the caster.

More importantly, however, it has been discovered that the braking force on the caster of said prior patent is one-half of the load only when there are no horizontal forces on the scaffold supported by the caster, and that the braking force is affected by horizontal forces, such as may be applied by a workman leaning against the scaffold. For example, for a horizontal force to the right, as seen in said patent, the braking force will increase from a value of one-half of the load, and the horizontal force to the right may be increased until it reaches a value almost equal to the load times the coefficient of friction between the caster and the floor, without causing the caster wheel to rotate. When the horizontal force to the right equals the load times said coefficient of friction, the locked caster wheel will skid on the floor to the right.

If a horizontal force is applied to the left, the braking force will decrease from the value of one-half of the load. When the horizontal force is increased to a value greater than the decreased braking force times the coefficient of friction between the caster wheel and caster housing, the caster wheel will rotate, allowing the scaffold to roll from its desired location. The amount of horizontal force to the left which will cause the caster wheel to roll to the left is considerably less than the amount of horizontal force to the right which causes the caster wheel to skid to the right.

The caster of the present invention differs in that the braking force is not affected by the application of horizontal forces in any direction, and the caster will remain braked until the horizontal force is increased to a value which will cause the caster wheel to skid on the floor.

Other objects and advantages will become apparent in the course of the following detailed description.

In the drawings, wherein like parts are designated by like reference numerals throughout the same, FIG. 1 is a side elevation view of a caster constructed in accordance with the present invention.

FIG. 2 is an end view of the caster of FIG. 1.

FIG. 3 is a sectional view, taken on line 3—3 of FIG. 2, with the caster wheel and locking lever omitted.

FIG. 4 is a perspective view of the locking lever.

FIG. 5 is a perspective view of the brake member.

FIG. 6A is a schematic illustration of the caster system showing the imposition of a vertical load thereon.

FIG. 6B is a free body diagram of the caster wheel with the forces of FIG. 6A acting thereon.

FIG. 6C is a closed vector force diagram of the forces indicated in FIG. 6B.

FIGS. 7A, 7B and 7C are, respectively, a schematic illustration of the caster system, a free body diagram and a closed vector force diagram, showing the imposition of a vertical load and a horizontal force acting to the right.

FIG. 7D is similar to FIG. 7C and illustrates the effect of the imposition of a different value of horizontal force.

FIGS. 8A, 8B, 8C and 8D are similar to FIGS. 7A, 7B, 7C and 7D, illustrating the imposition of a vertical load and a horizontal force acting to the left.

FIG. 9 illustrates the manner of determining the point of application of the braking force to the caster wheel periphery.

Referring now to the drawings, wherein is illustrated a preferred embodiment of the invention, a caster wheel 10 having a rubber tire 11 is rotatably mounted on a hollow axle 12 through which passes a stud 13 having threaded ends 14 projecting from each side of the wheel. The caster wheel 10 is clamped to the axle by means of a U-shaped locking lever 15. The lever 15 is provided with aligned holes 16 in the legs 17 thereof to receive the ends of the stud 13, and it is secured in place and clamping is effected by means of lock nuts 18 threaded over the ends of the stud.

The legs 17 of the U-shaped locking lever extend upwardly at their free or rearward ends to form ears 19. The ears 19 are provided with forwardly extending lugs 20 which are bent outwardly for a purpose to be hereinafter described.

The locking lever 15 is provided with aligned holes 21 in the legs thereof so that the locking lever may be pivotally mounted on a generally U-shaped caster housing 22, the stubs 23 formed on the opposed side walls 24 of the caster housing being received within the locking lever holes 21.

The caster housing 22, preferably formed from aluminum, is open at the front end thereof and is provided on the top thereof with a vertical spindle 25 which is stepped to provide an upwardly facing shoulder 26. A bearing member 27 fits onto the spindle for rotation thereon, the bearing housing member 27 bottoming on spindle shoulder 26. In turn, a hollow supporting leg 28 of a scaffold telescopes onto the bearing housing member 27, and is frictionally engaged therewith in a conventional manner.

The caster housing 22 is provided with aligned stubs 29 extending inwardly from the side walls adjacent the upper rear ends thereof and is provided with bosses 30 extending inwardly from the side walls adjacent the lower rear ends thereof, the bosses 30 each being provided with a shoulder 31 facing forwardly towards the front of the caster housing.

A brake member 32, preferably formed from steel rod, comprises a generally rectangular closed loop, the shape of which is best seen in FIG. 5. The loop has parallel sides 33 and a braking surface 34 extending between the sides 33 at one end of the loop. The sides 33 at the other end of the loop are curved at 35 and the ends 36 of the rod extend towards each other to form the other end of the loop.

The brake member 32 is inserted in the caster housing so that the curved portions 35 of the loop fit over the caster housing stubs 29 and so that the loop sides 33 can engage the boss shoulders 31, as best illustrated in FIG. 3. With this arrangement, the loop can pivot about the stubs 29 with the clockwise rotation being limited by shoulders 31.

As may be seen, the locking lever 15 is pivotally mounted on the caster housing 22 for rotation about a horizontal axis defined by the aligned centers of the caster housing stubs 23. When the locking lever is in its upper position, as indicated by the broken lines in FIG. 1, the horizontal axis of the caster wheel will be to the right of a vertical plane passing through the axis defined by stubs 23. The caster wheel 10 will then be eccentric to the vertical spindle axis and accordingly is capable of pivotal movement about that axis, and is also capable of rotational movement about its own axis. The lugs 20 of the locking lever frictionally engage the side walls of the caster housing when the locking lever is in its upper position, thus securing the locking lever and caster wheel against accidental release to the locked position when such is not desired.

When it is desired to lock the caster wheel, it is merely necessary to depress the locking lever to the position shown in full lines. This operation results in pivoting the caster wheel about the stubs 23 so that the caster wheel axis moves over center to the other side of the vertical plane passing through the stubs 23. The pivotal movement of the caster wheel about the stubs 23 ceases when the caster wheel engages the braking surface 34 of the brake member 32 and the caster wheel is aligned so that the vertical axis of the spindle intersects the caster wheel axis. Hence, not only is the caster wheel locked against rotation by its engagement with the brake member 32, but it is also locked against pivotal movement about the spindle.

The functioning of the caster assembly under vertical and horizontal loadings is best described in connection with FIGS. 6–8. At the outset, it should be pointed out that these figures relate to the one particular embodiment of the invention illustrated in FIGS. 1–5. For this particular embodiment, when the caster assembly is locked, the angle $\alpha_1$ between the line extending vertically upwardly from the caster wheel axis and the line extending upwardly from the caster wheel axis to the axis defined by stubs 23 is 30°, and the angle $\alpha_2$ (taken in the same direction as the angle $\alpha_1$) between the line extending upwardly from the caster wheel axis and the line extending between the caster wheel axis and the point of engagement of the braking surface 34 with the periphery of the caster wheel is 240°. The manner in which the value of $\alpha_2$ is determined for a given value of $\alpha_1$ will be discussed below in greater detail in connection with FIG. 9.

FIG. 6A illustrates the case wherein the locked caster assembly is subjected only to a vertical load $F_1$ imposed thereon. FIG. 6B is a free body diagram of the caster wheel, showing the forces acting on the wheel. The vertical load on the caster assembly is resisted by an equal force $F_1$ acting upwardly on the bottom of the wheel. The braking surface 34 of the brake lever imposes a force $F_2$ acting on the periphery of the wheel at a clockwise angle of 240° from vertical and the force transmitted through the locking lever 15 from the caster housing to the axle of the caster wheel imposes a force $F_3$ acting downwardly on the caster wheel along a line 30° from vertical. FIG. 6C is a vector diagram illustrating the relative magnitude of the forces imposed on the caster wheel. Since the system is in equilibrium, the vector diagram is closed. As is seen from FIG. 6C, force $F_2$ is equal to force $F_1$, which shows that the braking force $F_2$ is equal to the load $F_1$ carried by the caster assembly.

FIG. 7A illustrates the caster assembly in a condition wherein the assembly is again subjected to a vertical load $F_1$ and wherein a horizontal force $F_H$ to the right is now imposed on the system. The free body diagram of the caster wheel, FIG. 7B, again shows the forces $F_1$, $F_2$ and $F_3$ acting on the wheel at the same angles discussed above. The horizontal force on the assembly, which would tend to cause the locked wheel to skid, is resisted by the frictional force $F_H$ between the wheel and the floor, which force $F_H$ acts tangentially of the wheel at the bottom thereof and to the left. Since the system is in equilibrium, the force $F_H$ is opposed by an equal and opposite tangential force $F_B$, which represents the frictional resistance to rotation produced by the braking surface 34 on the wheel.

The closed vector diagram of FIG. 7C is similar to FIG. 6C with the addition of the torque forces of $F_H$ and $F_B$. Again, it will be seen that $F_2$ is equal to $F_1$, indicating that the braking force $F_2$ is not affected by the horizontal force to the right on the caster assembly. As compared to FIG. 6C, it will be noted that the force $F_3$, i.e., the force acting through the locking lever 15 between the axis of the caster wheel and the caster housing stubs 23, is decreased by the addition of the horizontal force to the right on the assembly. Another way of explaining this result is to note that the resultant force of the two equal forces $F_H$ and $F_B$ of FIG. 7C is a force acting upwardly on the caster wheel through the axis thereof along the same line as the force $F_3$. Thus, the original force $F_3$, shown in FIG. 6C when there is no horizontal force, is opposed by the resultant force of the torque forces $F_H$ and $F_B$ of FIG. 7C so that the force $F_3$ is now reduced.

FIG. 7D is a closed vector force diagram illustrating the relative magnitude of the forces if a greater horizontal force $F_H$ is applied. A greater magnitude of $F_H$ is, of course, opposed by a greater magnitude of $F_B$, and the greater resultant force of $F_H$ and $F_B$ will further reduce the magnitude of $F_3$. However, the force $F_2$ will again be unaffected and will remain equal to the load $F_1$.

FIG. 8A illustrates the caster assembly with the direction of horizontal force being reversed. As seen in the free body diagram, FIG. 8B, the horizontal force is now resisted by a tangential frictional force $F_H$ acting to the right, this force $F_H$ being opposed by an equal and opposite tangential force $F_B$ where the braking surface 34 engages the periphery of the wheel. The closed vector force diagram of FIG. 7C illustrates the relative magnitudes of the forces involved. Again, the resultant force of $F_H$ and $F_B$ acts along the same line as force $F_3$, but the resultant force of $F_H$ and $F_B$ acts in the same direction as $F_3$ so that the total $F_3$ is increased from that of FIG. 6C. The force $F_2$ remains equal to $F_1$, showing that the braking force $F_2$ is unaffected by the imposition of the horizontal force on the system.

FIG. 8D is a closed vector force diagram of the forces on the wheel when a greater horizontal force is imposed. The forces $F_H$ and $F_B$ are increased, which increases $F_3$, but $F_2$ remains the same.

As is thus apparent, the braking force $F_2$ remains constant and equal to the vertical load even though the system is subjected to horizontal forces in either direction.

The caster wheel will not rotate unless a torque is applied which is greater than $\mu_2 F_2$, $\mu_2$ being the coefficient of friction between the rubber caster tire and the steel braking surface. Since the round rod of the braking lever indents the rubber tire of the wheel under the pressure of force F the value of $\mu_2 F_2$ is at least slightly higher than the value of $\mu_1 F_1$, $\mu_1$ being the coefficient of friction between the rubber tire and the usual concrete surface on which the caster rests. The effect of this is that a horizontal force may be applied to the system up to the value of $\mu_2 F_2$ without causing the caster wheel to rotate against the force of the brake. However, a horizontal force of the value of $\mu_2 F_2$ cannot be applied to the system because a lesser value of force equal to $\mu F_1$ will cause the caster wheel to skid on the floor.

Thus, the caster assembly will remain locked and motionless in spite of the imposition of horizontal force in any direction, until the horizontal force increases sufficiently to cause the locked wheel to skid. Even then, the skidding caster wheel will remain locked against rotation.

In the illustrated embodiment of the invention the angle $\alpha_1$ has been shown as equal to 30°. The selection of this angle is somewhat arbitrary and is dictated by the following consideration. The angle $\alpha_1$ must be greater than 0° so that an over-center action can be obtained in moving the caster wheel between its locked and unlocked positions. The angle $\alpha_1$ must be sufficiently greater than 0° so that a sufficiently large enough force must be applied to the locking lever to move the caster wheel to unlocked position in order to prevent accidental unlocking if a workman should accidentally kick or hit the lever. Similarly, the angle $\alpha_1$ must be sufficiently small so that a workman can unlock the caster wheel with relative ease when he so intends. It has been found from experience that an angle $\alpha_1$ equal to 30° is a desirable angle.

As explained above, the angle $\alpha_1$ can vary according to the desire of the designer. For any value of $\alpha_1$ which is selected, there is one particular location on the periphery of the wheel to be engaged by the braking surface 34, $\alpha_2$, so that the braking force $F_2$ will be equal to the load $F_1$ and so that the resultant of the torque forces $F_H$ and $F_B$ will act through the axis of the wheel at the same angle $\alpha_1$ as $F_3$. FIG. 9 illustrates the manner in which $\alpha_2$ can be found for any given angle $\alpha_1$. Construct a circle of any given radius, and locate a line $a$ passing through the axis of the circle at the angle $\alpha_1$ from vertical. Draw a force arrow $F_1$ upwardly from the axis of the circle to intersect the circle. At this point of intersection of the circle construct the force arrow $F_3$ parallel to line $a$, which force arrow will then intersect the circle at point $b$. Point $b$ and the axis of the circle will then represent the force arrow $F_2$. Since $F_2$ and $F_1$ are both radii of the circle, they are equal to each other.

Since arrow $F_3$ is parallel to line $a$, the included angle between $F_3$ and $F_1$ is equal to $\alpha_1$, and since $F_2$ is equal to $F_1$, the included angle between $F_3$ and $F_1$ is also $\alpha_1$. The included angle between $F_1$ and $F_2$ is then equal to $180° - 2\alpha_1$, and consequently the clockwise angle from vertical to $F_2$ is $180 + 2\alpha_1$.

As will be noted, since the tangential forces $F_H$ and $F_B$ are always equal and opposite, the resultant thereof, $F_R$, lies on a line passing through the axis of the circle at the same angle as line $a$.

As is thus apparent, the form of the invention herein shown and described is to be considered as a preferred embodiment of the invention, and it is to be realized that various changes can be made in the shape, size and arrangement of parts without departing from the spirit of the invention or the scope of the attached claims.

Having thus described my invention, what I claim is:

1. A caster comprising:
   a caster housing,
   means on said caster housing for attaching said caster housing to an apparatus to be supported by said caster,
   a locking lever mounted on said caster housing for pivotal movement about a first horizontal axis,
   a caster wheel mounted on said locking lever for rotation about a second horizontal axis which is spaced from said first axis,
   said locking lever being movable between a first position wherein said axis of said wheel is on one side of a vertical plane passing through said first horizontal axis and a second position wherein said axis of said wheel is on the other side of said vertical plane,
   said caster housing having a braking surface carried thereby engageable with the periphery of said wheel when said brake lever is in its first position,
   and wherein $\alpha_2 = 180° + 2\alpha_1$,
   $\alpha_1$ being the angle between a line extending vertically upwardly from the axis of said wheel and a line extending from the axis of said wheel through the first horizontal axis when said locking lever is in its first position, and $\alpha_2$ being the angle measured in the same direction as $\alpha_1$ between said line extending vertically upwardly from the axis of said wheel and a line extending from the axis of said wheel to the point of engagement of said braking surface and said periphery of said wheel.

2. A caster comprising:
   a caster housing,
   a vertical spindle secured to said caster housing for attachment to an apparatus to be supported by said caster,
   a locking lever mounted on said caster housing for pivotal movement about a first horizontal axis offset from the vertical axis of said spindle,
   a caster wheel mounted on said locking lever for rotation about a horizontal axis spaced from said first horizontal axis,
   said locking lever being movable between a first position wherein said axis of said wheel is on one side of a vertical plane passing through said first horizontal axis and the vertical axis of said spindle intersects the axis of said wheel and a second position wherein said axis of said wheel is on the other side of said vertical plane,
   said caster housing having a braking surface carried thereby engageable with the periphery of said wheel when said brake lever is in its first position,
   and wherein $\alpha_2 = 180° + 2\alpha_1$,
   $\alpha_1$ being the angle between a line extending vertically upwardly from the axis of said wheel and a line extending from the axis of said wheel through the first horizontal axis when said locking lever is in its first position, and $\alpha_2$ being the angle measured in the same direction as $\alpha_1$ between said line extending vertically upwardly from the axis of said wheel and a line extending from the axis of said wheel to the point of engagement of said braking surface and said periphery of said wheel.

3. A caster comprising:
   a caster housing having depending spaced side walls,
   a vertical spindle secured to said caster housing for attachment to an apparatus to be supported by said caster,
   a U-shaped locking lever having the legs thereof mounted intermediate their ends to the side walls of said caster housing for pivotal movement of said locking lever about a first horizontal axis offset horizontally from the vertical axis of said spindle,
   a caster wheel mounted between the ends of the legs of said locking lever for rotation about a horizontal axis spaced from said first horizontal axis,
   said locking lever being movable relative to said caster housing between a first position wherein said axis of said wheel is intersected by the vertical axis of said spindle and is on one side of a vertical plane passing through said first horizontal axis and a second position wherein said axis of said wheel is on the other side of said vertical plane,
   said caster housing having a braking surface carried thereby engageable with the periphery of said wheel when said brake lever is in its first position,
   and wherein $\alpha_2 = 180° + 2\alpha_1$,
   $\alpha_1$ being the angle between a line extending vertically upwardly from the axis of said wheel and a line extending from the axis of said wheel through the first horizontal axis when said locking lever is in its first position, and $\alpha_2$ being the angle measured in the same direction as $\alpha_1$ between said line extending vertically upwardly from the axis of said wheel and a line extending from the axis of said wheel to the point of enment of said braking surface and said periphery of said wheel.

References Cited by the Examiner

UNITED STATES PATENTS

| | | | |
|---|---|---|---|
| 2,512,941 | 6/1950 | Johnson | 16—35 |
| 2,660,265 | 1/1953 | Middendorf | 16—35 |

JOSEPH D. SEERS, *Primary Examiner.*